United States Patent [19]
Donnelly

[11] Patent Number: 5,929,851
[45] Date of Patent: Jul. 27, 1999

[54] GROUPING OF OPERATIONS IN A COMPUTER SYSTEM

[75] Inventor: Vanessa Donnelly, Styvechale, United Kingdom

[73] Assignee: International Business Machines Corporation, Armonk, N.Y.

[21] Appl. No.: 08/778,316

[22] Filed: Jan. 2, 1997

[30] Foreign Application Priority Data

Jul. 20, 1996 [GB] United Kingdom .................... 9615293

[51] Int. Cl.⁶ .................................................. G06F 15/00
[52] U.S. Cl. ........................... 345/333; 345/349; 345/350
[58] Field of Search ..................... 345/333, 339, 345/340, 342, 348, 349, 350

[56] References Cited

U.S. PATENT DOCUMENTS

| | | | |
|---|---|---|---|
| 4,692,858 | 9/1987 | Redford et al. .......................... | 364/200 |
| 5,347,627 | 9/1994 | Hoffmann et al. ....................... | 345/357 |
| 5,551,028 | 8/1996 | Voll et al. ................................. | 707/103 |
| 5,652,850 | 7/1997 | Hollander ................................ | 345/333 |
| 5,668,964 | 9/1997 | Helsel et al. ............................ | 345/350 |

FOREIGN PATENT DOCUMENTS

| | | |
|---|---|---|
| 0409588 | 1/1991 | European Pat. Off. . |
| 0540925 | 5/1993 | European Pat. Off. . |
| 0585131 | 3/1994 | European Pat. Off. . |

*Primary Examiner*—Huynh Ba
*Attorney, Agent, or Firm*—George E. Grosser; Andrew J. Dillon

[57] ABSTRACT

A computer system connectable to a display device to display a graphical user interface through which a user can select an action in order to invoke a desired operation, and a method of operation of such a system. The action is selectable by one or more views of that action provided via the graphical user interface, and the system is characterized by means for providing a container object which is displayable via the graphical user interface on the display device, the container object being arranged to respond to user selection by creating a user page for display to the user. Further, the system is characterized by identifying means for identifying when a user selection of the container object has occurred, and for informing the container object of that selection, thereby causing a user page to be created, and view association means for enabling a user to associate views of actions with the user page created upon selection of the container object. Preferably, means are provided for enabling the user to associate a user page created from the container object with a collective view of actions. By such a technique, the user is provided with an easy to use mechanism for grouping actions together as desired, for example so that his/her most commonly used actions are provided in one place.

8 Claims, 11 Drawing Sheets

GROUPING OF OPERATIONS IN A COMPUTER SYSTEM

FIELD OF THE INVENTION

The present invention relates generally to computer systems having user interfaces through which a user can select operations to be performed by the computer system, and in particular to techniques for enabling the user to group such operations in a way that facilitates later selection.

BACKGROUND INFORMATION

User interfaces allow the computer user to interact or communicate with the computer system. User interfaces are typically implemented with a display screen and a user-controlled entry device, such as a keyboard, mouse, microphone, light pen or the like. The display screen displays information and data to the user and the user uses the entry device to give commands and provide information to the computer system.

During recent years, more and more people have wanted and needed to use the power of the computer in their daily work. However, generally these users do not want to be required to know specific commands, operators, syntax rules, etc, and much work has been expended on developing user interfaces which alleviate the need for such levels of knowledge. The most common form of user interface nowadays is the so-called graphical user interface (or GUI). Typically, a GUI presents the user with windows and icons. Windows typically include a menu bar, a tool bar, and a client area. The client area may typically include a number of icons, which are small stylized representations of entities (applications, folders, etc) with which the user works.

To enable the user to invoke particular operations on the computer system, the user interface needs to provide selection mechanisms to the user. In a typical user interface environment, this may be achieved by defining 'actions' which the user can select via 'views' of those actions provided via the user interface. For the purposes of this application, an action can be defined as a user initiated event which invokes an operation. The 'views' used to represent an action within the user interface may take a number of different forms, both visual and non-visual.

Figure 1A:
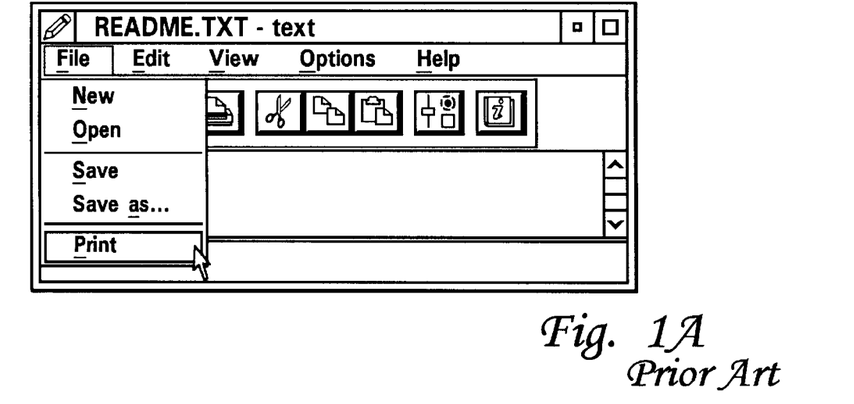
FIGS. 1A to 1F illustrate various examples of visual views used to represent actions.
Figure 1B:
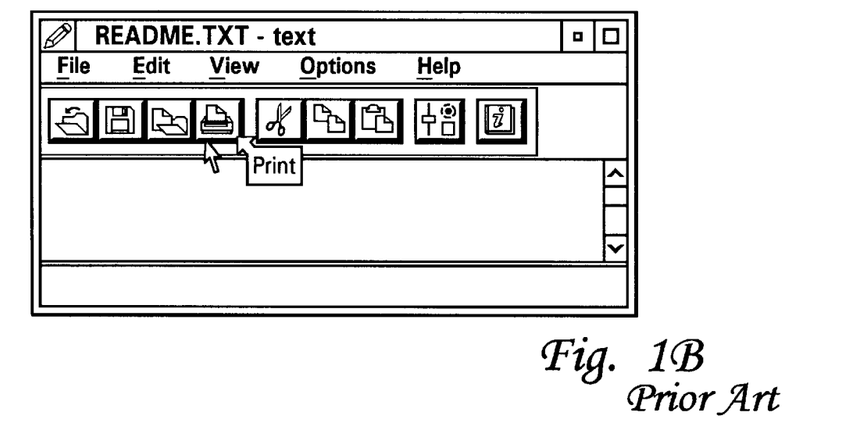
Figure 1C:
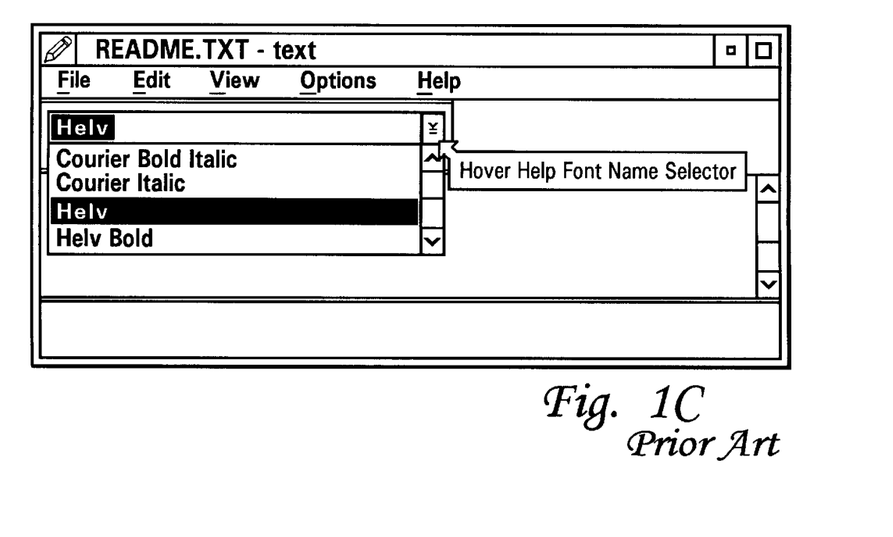
Figure 1D:
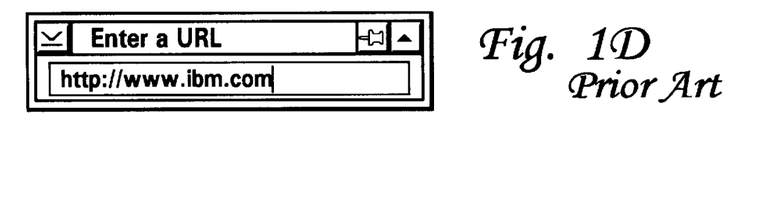
Figure 1E:
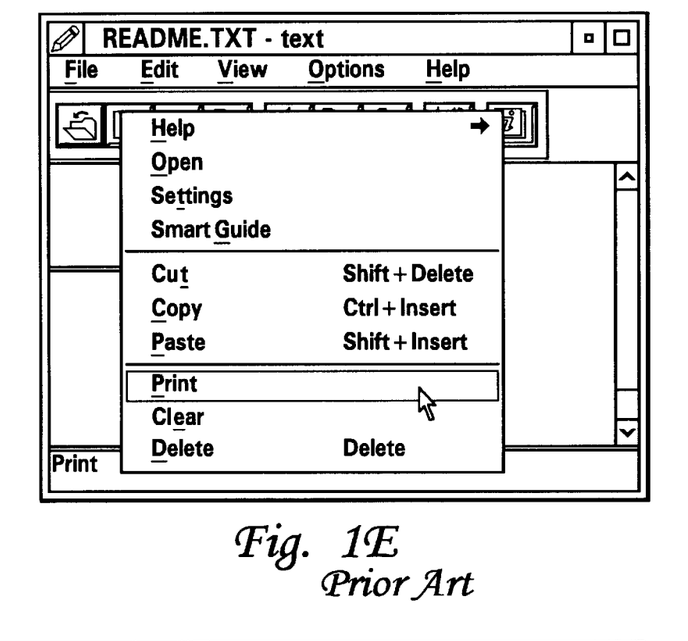
Figure 1F:
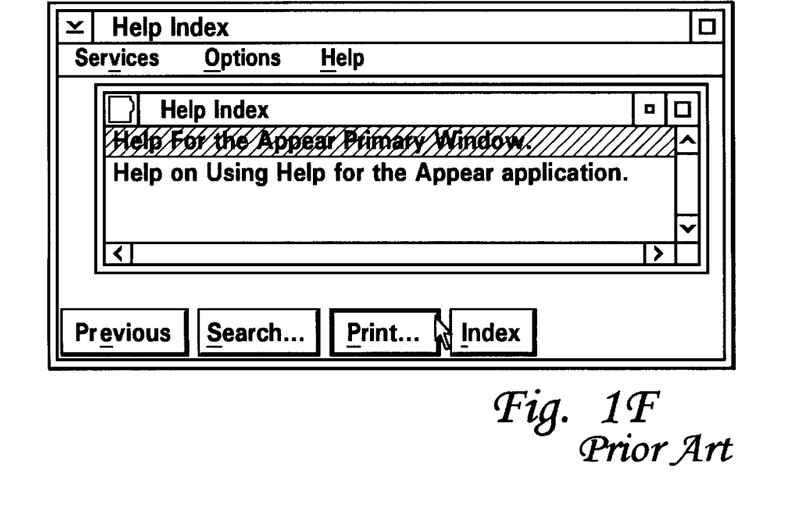

Typical examples of visual views used in GUIs would be a word or phrase on a menu bar (as illustrated in FIG. 1A where the 'Print' action is selected from a word view), a graphical representation such as an icon or bitmap on a tool bar (as illustrated in FIG. 1B where the 'Print' action is selected from a print bitmap view), or other visual controls that enable user selection or input. Examples of such other controls are a combination box control that allows font selection (as illustrated in FIG. 1C), or an entry field that allows the setting of a string property such as setting the name of a directory or setting a tool bar name (as illustrated in FIG. 1D). Further examples of visual views are illustrated in FIG. 1E, where the print action is selectable from a context or pop up menu displayed by depressing the right mouse button whilst positioned over the window area, and in FIG. 1F where the print action is selectable from a push button view in a window layout.

The present invention concerns visual views of actions (as opposed to non-visual views), and in particular techniques which enable a user to group views together so that, for instance, views of actions most commonly used by the user can be grouped together.

In current day applications, the views for a set of actions are often grouped together in some way. For example, sets of actions may be represented as menu bars, tool bars and pop up menus, as already illustrated in FIGS. 1A, 1B and 1E respectively. For the purposes of the present application, such groupings of views shall be referred to herein as 'collective views'. When the application developer is developing the application, he/she will generally create collective views to represent a logical grouping of actions. However, from the end user's point of view, these groupings may not represent the ideal groupings that the user would like.

However, unfortunately, most modern day applications only provide the user with limited ability to customise the collective views defined by the developer. For instance, Lotus Notes provides a 'smart icon' facility, whereby the user can control the content of tool bars by using a drag and drop mechanism to drag actions from a list on to a tool bar. The mechanism of dragging and dropping UI objects in GUIs is well known to those skilled in the art, and hence need not be described in any more detail herein. With regards to the list in Lotus Notes, each entry in the list provides the user with a graphical image and a name identifying the action represented by that image. Further Lotus Wordpro extends the smart icons functionality by not only allowing the content of tool bars to be modified by the user but also specifying the context in which a selected tool bar will display.

Microsoft Word allows both customisation of tool bars and menu bars through drag and drop mechanisms. Customisation extends to allowing the user to assign keyboard fast key selections (or accelerators) to actions. The possible list of actions that the user can choose from also includes some actions that have a control type interface such as a combination box (sometimes referred to as a drop down list). An example of this type of action is a font selection action that displays a set of fonts within a drop down list, the user being able to select one of the fonts to change the font of selected textual objects within the client area.

Whilst the above mechanisms provide the user with some ability to customise tool bars, menu bars and keyboard fast key selections (or accelerators), they do not provide mechanisms for customising other types of collective views. Further, they are limited to certain types of actions. In particular, these techniques are not used for all types of actions that appear within the user interface. A category of action which is not generally made available for user selection during customisation is a 'property action'. Herein the term 'property action' will be used to refer to those actions that hold an item of user-selectable data such as a font name, a file name, etc. The user-selectable data may be chosen by the user from a list of possible data (such property actions may be referred to as 'selector' property actions), or alternatively the user may be able to enter the data directly, eg. through an entry field. Although Microsoft Word provides the limited capability of allowing the user to select certain selector property actions from the list of all available actions, it does not allow all of the property actions within its interface to be dragged and dropped on to collective views.

Since property actions have some user-selectable data associated therewith, they tend to be made available to the user via views such as combination box controls or entry fields, such views having already been illustrated with reference to FIGS. 1C and 1D respectively. Since views of property actions include user-selectable data, it is more difficult to provide for such views to be moved around between various collective views, because there is then a requirement to provide some mechanism to handle view concurrency (ie any change to the user-selectable data in one view must be replicated in any other view of that property action). Hence prior art techniques such as the 'smart icons' available in Lotus Notes have only enabled such customisation in relation to views of more standard actions such as cut, paste, copy, save, etc which do not include user selectable data. Further, whilst the prior art techniques within Microsoft Word allow a pre-defined number of property actions to be selected by the user and added to the tool bar, this is the exception rather than the norm, and they do not allow all property actions to be moved between different collective views.

It should also be noted that, because property actions are typically represented via rather 'large' views such as entry fields and combination box controls, then even if techniques were provided which enabled any number of them to be dropped on to collective views, it is questionable whether collective views such as tool bars would be suitable for holding views of property actions, since at present tool bars tend to be small so that they do not occupy too much of the application display area. A user would soon 'outgrow' the tool bar if he/she were to add property action views such as combination box controls and entry fields. Further, the tool bar is also not designed to show larger views such as list boxes or vertically arranged groups of check boxes and buttons.

Figure 2:
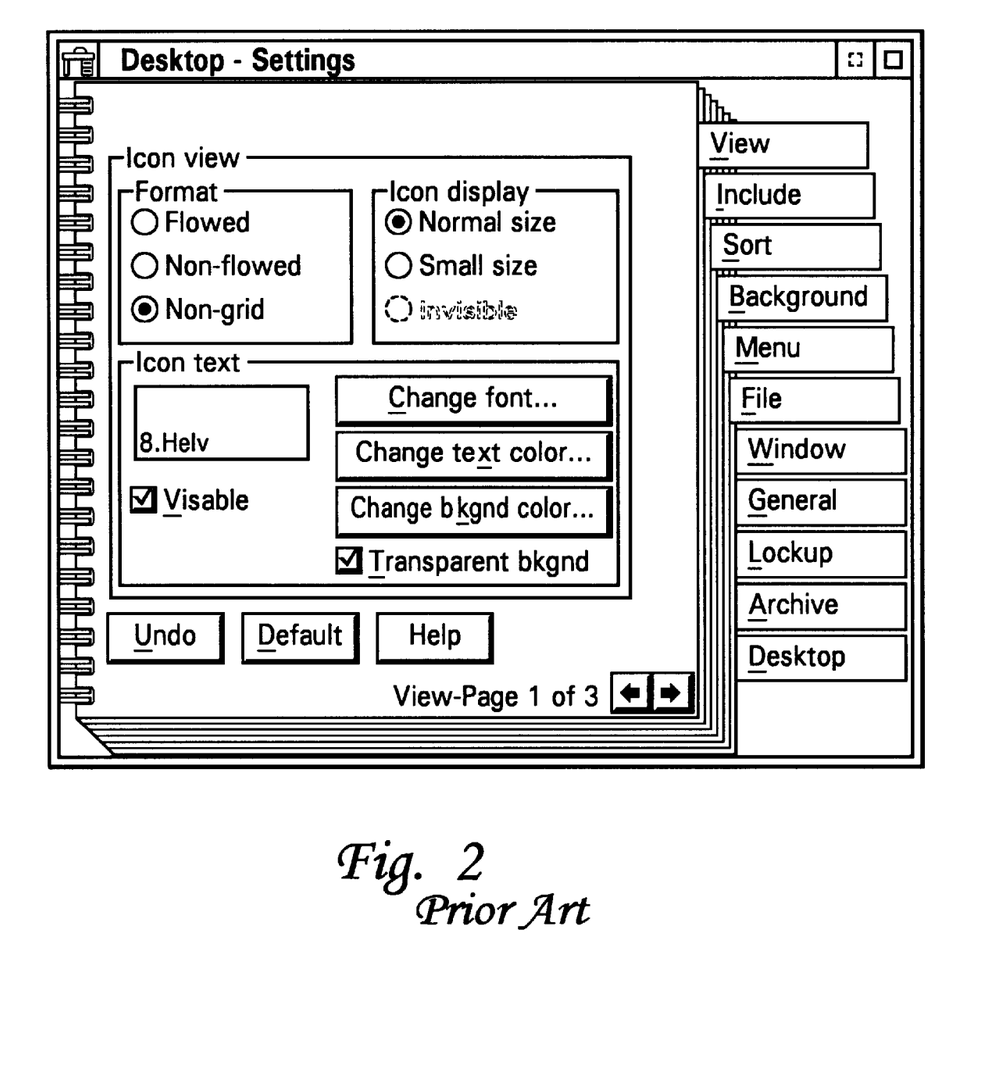
FIG. 2 illustrates a notebook used to contain a number of actions.

Another type of collective view which illustrates the customisation problem facing users of GUI applications is the notebook. A typical notebook is illustrated in FIG. 2. As can be seen from that figure, the notebook consists of a number of pages, and any particular page can be accessed by selecting a tab associated with that page. An example of a notebook is the desktop settings notebook provided in the IBM OS/2 operating system. This notebook contains ten or so pages, each of which contains a number of entry fields, combination boxes, buttons, and other views. Additionally, some pages include a number of subsidiary pages. Hence, a notebook is potentially a powerful tool, since it can contain a large number of actions therein. However, up to now, the end user has not been provided with any facility to customise these notebooks, and so, even though the user may only use a small subset of the actions on a regular basis, he/she needs to spend a significant amount of time going through the various pages of often quite large notebooks trying to remember where the particular actions that he/she requires are located.

From the above discussion, it will be apparent that there is a need for a mechanism to be provided which will enable the end user to customise collective views to include those actions which he/she wishes to group together, eg those which he/she makes most use of.

SUMMARY OF THE PRESENT INVENTION

Accordingly the present invention provides a computer system connectable to a display device to display a graphical user interface through which a user can select an action in order to invoke a desired operation, the action being selectable by one or more views of that action provided via the graphical user interface, the system being characterised by: means for providing a container object which is displayable via the graphical user interface on the display device, the container object being arranged to respond to user selection by creating a user page for display to the user; identifying means for identifying when a user selection of the container object has occurred, and for informing the container object of that selection, thereby causing a user page to be created; and view association means for enabling a user to associate views of actions with the user page created upon selection of the container object.

Viewed from a second aspect, the present invention provides a method of operating a computer system connectable to a display device to display a graphical user interface through which a user can select an action in order to invoke a desired operation, the action being selectable by one or more views of that action provided via the graphical user interface, the method being characterised by the steps of: providing a container object which is displayable via the graphical user interface on the display device, the container object being arranged to respond to user selection by creating a user page for display to the user; employing an identifying means to identify when a user selection of the container object has occurred, and to inform the container object of that selection, thereby causing a user page to be created; and associating a view of an action with the user page upon receipt of signals from a user operated device connectable to the system indicating a user association of that view with the user page.

Using the technique of the present invention, a user interface (UI) object is created, which will be referred to hereafter as a 'Note Pad' object. The Note Pad object may be displayed individually within the GUI, or alternatively may be displayed as part of a list of available UI objects. In preferred embodiments, a template action palette view is provided which is displayable on the display device to provide a list of available template actions including a representation of the container (or note pad) object.

Irrespectively of how the note pad object is displayed, upon selection of the note pad object by the user (eg by moving the mouse pointer over the note pad object, and clicking the left mouse button to select it), the note pad object creates a blank user page for display to the user. Views of actions chosen by the user can then be added to the user page.

Further, the user page can be associated with collective views to provide an area in to which actions chosen by the user can be added (either before or after association with the collective view). Typically the user page can be associated with a collective view by dragging it on to that view. This may be done after the user page is created, or alternatively may be done at the time the user page is created from the note pad object. If the user is using a mouse, then the latter approach can be realised by moving the mouse cursor over the note pad object, depressing the drag mouse button to select the note pad object, moving the mouse cursor over the collective view with which the user page is to be associated, and then releasing the drag mouse button. Upon release of the drag mouse button, a blank user page is created by the note pad object, and this user page is associated with the collective view indicated by the user. This type of drag and drop mechanism is well known to those skilled in the art, and hence need not be described in any further detail herein.

If the collective view of actions is a note book, then preferably the user page associated with the note book is represented in the note book as one of the pages of the notebook, the view association means enabling the user to add views included in other pages of the note book to the user page. In preferred embodiments, when the user drags the user page on to a note book, the user page becomes the top page of the note book, and the user is then free to add actions to that user page as he/she wishes. This enables the user to promote frequently used actions provided within the various pages of the note book to the top user page, thereby alleviating the problems involved in trying to remember where those actions are within the notebook.

If the user drags the user page on to a tool bar, it is preferably represented on the tool bar as a tool bar button. The user can then select the button in order to bring up an enlarged representation of the user page. By this approach the space constraint problem associated with tool bars is alleviated. The user page can contain which ever actions the user wishes, whether they be property actions or otherwise. Since all that is added to the tool bar is another button, then valuable tool bar space is not taken up by providing property action views directly on the tool bar.

In preferred embodiments, the view association means utilizes drag and drop functions provided via the graphical user interface to enable the user to associate views with the user page.

The real world metaphor for the note pad object is a never empty pad of paper from which users can tear off new blank sheets and then attach those sheets to collective views such as tool bars or note books.

To enable the full benefits of the note pad object to be realised, it is necessary to provide a mechanism which enables all types of actions to be added by the user to the blank user pages created from the note pad object. In the preferred embodiment, this is achieved by employing the invention described in copending UK patent application 9613767.4, a copy of which is enclosed on the Patent Office file for reference. According to the invention described in that patent application, a single mechanism is provided for dealing with actions. This mechanism takes the form of an OOP object called an 'action object' which defines, for each available view that can be employed to represent that action, the attributes required to provide that view, and an identifier to identify the operation to be invoked upon selection of the action.

Further, in preferred embodiments of that invention, a single mechanism for dealing with the construction of collective views is provided. This mechanism takes the form of an OOP object, referred to as a menu definition, which preferably contains: (a) a set of entries that individually represent either an action object, a separator or a reference to another instance of a menu definition; and (b) the attributes required to provide a representation for a collective view on actions.

Object Oriented Programming (OOP) is a particular approach to software development which implements required functions by way of 'messages' sent to 'objects'. An 'object' is a software package that contains a collection of data and related software procedures (often called 'methods'). Typically, objects are created as instances of a particular 'Object Class', the class being a template for defining the procedures and data for a particular type of object. A 'message' is a signal sent to an object to request that object to carry out one of its procedures. Hence a message sent to an object will cause a procedure to be invoked to implement the required function.

By employing action objects and menu definitions to represent actions and collective views of those actions, single event generation can be achieved from multiple views, and therefore the application does not need to concern itself with how the user generated the call. The action views query the attributes of the action object directly, all the necessary data is held in one place, and with automatic view concurrency, the application developer no longer has to worry about keeping action views synchronised with each other. Hence, it is possible to provide much more freedom to the user to allow him/her to manipulate the views of actions, for example by moving the views around between and within collective views.

BRIEF DESCRIPTION OF THE DRAWINGS

The present invention will be described further, by way of example only, with reference to a preferred embodiment thereof as illustrated in the accompanying drawings, in which.

DESCRIPTION OF THE PREFERRED EMBODIMENT

For the purposes of the preferred embodiment of the present invention, a computer system will be considered which incorporates the mechanisms for representing actions described in copending UK patent application 9613767.4, mentioned earlier. It will be appreciated by those skilled in the art that the OOP mechanisms described in that patent application are not essential for the purposes of the present invention. However, by employing such mechanisms, it is possible to provide the end user with great flexibility as to which views of actions he/she adds to the user pages created by the note pad object. This flexibility is derived from the fact that the mechanisms described in UK patent application 9613767.4 remove the requirement for the application developer to keep action views synchronised with each other, all views, wherever they are within the GUI, causing the same action to be invoked.

Figure 3:
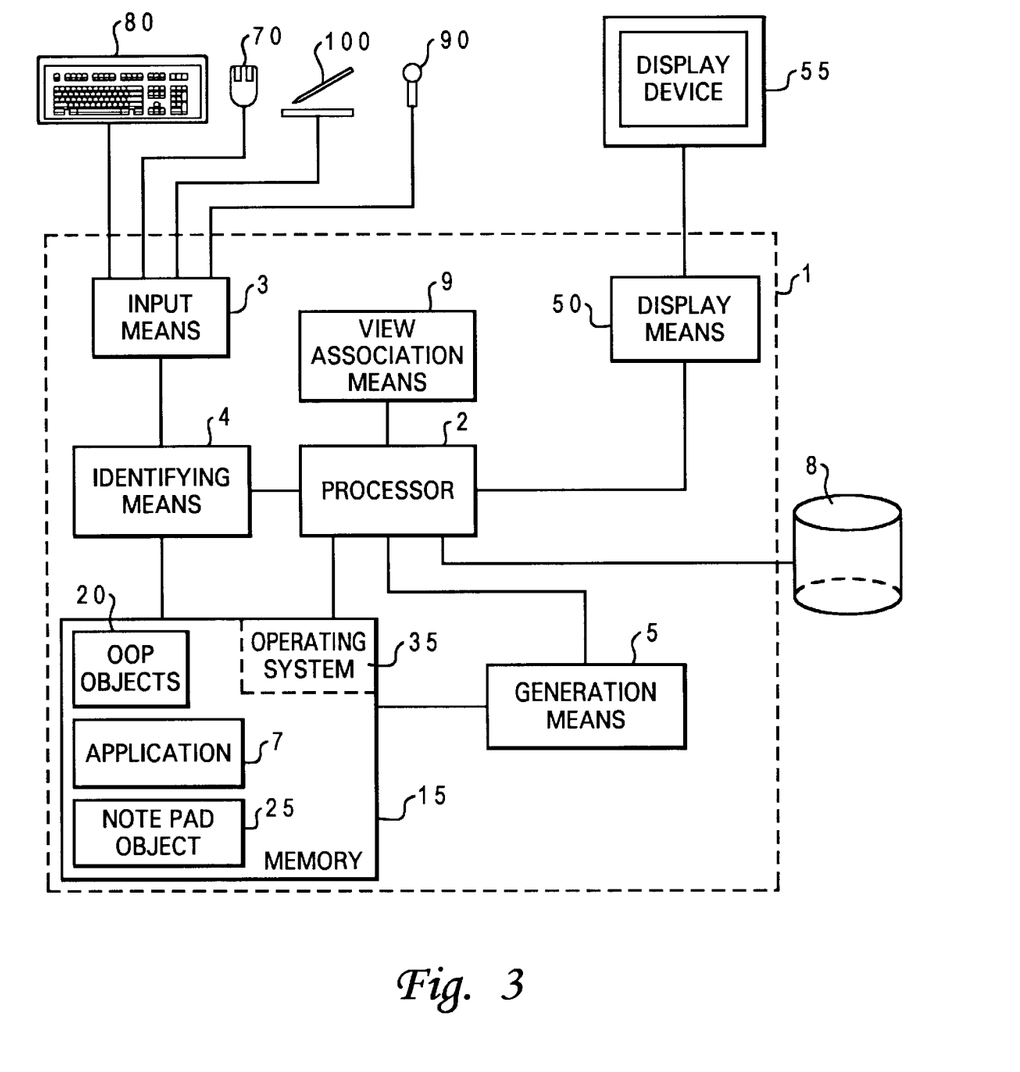
FIG. 3 is a block diagram illustrating a system in accordance with a preferred embodiment of the present invention.

The system of the preferred embodiment will now be discussed with reference to FIG. 3, which is a block diagram showing the main functional elements of the system. FIG. 3 illustrates a typical computer system 1 having an operating system 35 installed thereon, a central processing unit 2, memory 15, a storage device 8 which may be incorporated as part of the system or accessed remotely, and a display device 55 connectable to the computer system.

The processor 2 is arranged to pass display data to the display means 50 for display on the display device 55. As will be appreciated by those skilled in the art, the operation of the display means is generally known in the art, and hence need not be discussed in any further detail herein. It suffices to say that it encompasses the various software and hardware components used to pass data to the display device 55. In the IBM OS/2 operating system, a layer of OS/2 call Presentation Manager is used for this purpose.

In the preferred embodiment of the invention, a standard GUI is displayed on the display device 55 presenting the user with a number of windows and icons. A software application 7 is associated with one or more of these windows in the GUI. To enable the user to interact with the application 7 so as to invoke particular operations, the GUI preferably provides visual views of certain actions which the user can select. In addition, certain non-visual views such as accelerator data within an accelerator table may enable the user to select keyboard characters to invoke actions and hence the corresponding operation.

In addition to the visual views of actions displayed on the display device to the user, in preferred embodiments of the present invention, a UI container object 25, referred to herein as a 'note pad object', is also displayed to the user. As will be discussed in more detail later, the Note Pad object may be displayed individually within the GUI, or alternatively may be displayed as part of a list of available UI objects.

The user is able to select the note pad object 25 or the views of actions via an appropriate input device connected to the computer system 1. Examples of such input devices are a mouse 70, a keyboard 80, a microphone 90, or a pen 100. As will be appreciated by those skilled in the art, to select the container object or the visual views of actions such as buttons, menu bars and tool bars, the user would typically use the mouse 70. However, he/she may also choose to select actions via key entries on the keyboard 80 (eg accelerator keys), gesture entries via the pen, or voice entries via the microphone. However the input signal is generated, it will be received by the input means 3, and is then passed on to the identifying means 4 for analysis. As will be appreciated by those skilled in the art, the function of the input means 3 is typically provided by the operating system/GUI of the system, for example the mouse driver code in the case where the input device is a mouse. The identifying means 4 is preferably a software process executed under the control of processor 2 to identify whether the input signal corresponds to a selection of the note pad object or of a particular view of an action. In the preferred embodiment, the manner in which this identification is performed is provided as part of an action framework, which is discussed in more detail in copending UK patent application 9613767.4, a copy of which is enclosed on the Patent Office file for reference. However, it is not necessary to provide this function as part of the action framework, and instead, as will be appreciated by those skilled in the art, the identifying means 4 can be provided elsewhere.

If the identifying means 4 identifies that a user selection of the note pad object has occurred, then the note pad object 25 in memory 15 is notified. Then, under the control of the processor 2, the note pad object causes a blank user page to be created for display to the user. Views of actions chosen by the user can then be added to the user page. The view association means 9 is responsive to signals from the input means 3 to identify when a user has associated a view with the user page, and to keep a record in memory 15. The view association means 9 is preferably a software process executed under the control of processor 2 to keep track of views associated by the user with a user page. As will be appreciated by those skilled in the art, there are a number of ways in which the user could associate views with a user page. The most common and convenient of these is for the user to drag and drop the views on to the user page. However other techniques such as using clipboard functions could also be used.

A user page created from the note pad object can be associated with collective views, for example by dragging it on to that view. This may be done after the user page is created, or alternatively may be done at the time the user page is created from the note pad object. If the user is using a mouse, then the latter approach can be realised by moving the mouse cursor over the note pad object, depressing the drag mouse button to select the note pad object, moving the mouse cursor over the collective view with which the user page is to be associated, and then releasing the drag mouse button. Upon release of the drag mouse button, a blank user page is created by the note pad object, and this user page is associated with the collective view indicated by the user.

In preferred embodiments, when the user drags the user page on to a note book, the user page becomes the top page of the note book, and the user is then free to add actions to that user page as he/she wishes. This enables the user to promote frequently used actions provided within the various pages of the note book to the top user page, thereby alleviating the problems involved in trying to remember where those actions are within the notebook.

If the user drags the user page on to a tool bar, it is preferably represented on the tool bar as a tool bar button. The user can then select the button in order to bring up an enlarged representation of the user page. By this approach the space constraint problem associated with tool bars is alleviated. The user page can contain which ever actions the user wishes, whether they be property actions or otherwise. Since all that is added to the tool bar is another button, then valuable tool bar space is not taken up by providing property action views directly on the tool bar.

From the above, it is clear that user pages can be created by the user from the note pad object to contain customised groupings of views. In addition, views of actions will be available elsewhere within the GUI, whether individually, or as part of collective views such as tool bars and menu bars. Wherever the views are displayed, once the identifying means 4 identifies that a user selection of a view has occurred, the associated action object 20 in memory 15 is notified. Then, under the control of the processor 2, the object invokes a specified operation defined within the object. For example, if the view corresponds to a print action object, then that print action object will define a printing operation to be invoked upon selection of the print action.

As described more fully in UK patent application 9613767.4, the application developer will have defined the action objects 20 to be used by the application 7. Further, in accordance with the teaching of that patent application, OOP objects called menu definitions can be created to define collective views, these objects preferably containing: (a) a set of entries that individually represent either an action object, a separator or a reference to another instance of a menu definition; and (b) the attributes required to provide a representation for a collective view on actions. In the preferred embodiment, an action framework is provided to assist the developer in generating these action and menu definition objects, as already mentioned the action framework being described more fully in copending UK patent application 9613767.4. However, an action framework is not essential. Instead, as will be appreciated by those skilled in the art, the developer can construct his/her own objects using standard OOP techniques. By defining classes of objects which provide the standard view attributes and procedures relevant to objects of that class, the developer can then readily create multiple instances directly from those classes.

For the purposes of the present invention, the note pad UI object 25 may be provided as an OOP object or by other appropriate software techniques. In the preferred embodiment the note pad object is provided as an OOP object, and is preferably provided as part of the action framework. This note pad object will be referred to as a template action object, since it is a template from which instances of action objects can be created.

In the preferred embodiment, a template action object has the same attributes and methods as a standard action object, and hence defines, for each available view that can be employed to represent that action, the attributes required to provide that view, and an identifier to identify the operation to be invoked upon selection of the action. In addition, the template action object includes an additional optional initialize method which will automatically be called when a new instance of this object is created.

If a template action object is made available from a template action palette view, this palette view contains a drag and drop handler which detects the drag of a template action from within the list of actions and, when a valid drop is made, creates a new instance of the template action and calls the initialize method. In the note pad template action, the initialize method is used to rename the new action object to a user page. The user page action object created from the note pad object will then control the opening and displaying of the user page on the display screen. The user page action object also contains, when initialised, a reference to an empty user page menu definition. This menu definition object extends the standard menu definition object by not only having the ability to store a list of entries that may contain action objects but also having the capability to store for each action object the row and column within the user page where the action view is to be displayed. The standard way of providing different action views for different collective views and the querying of such views is described in more detail in the earlier mentioned copending UK patent application 9613767.4, a copy of which is provided on the Patent Office file for reference.

Figure 4:
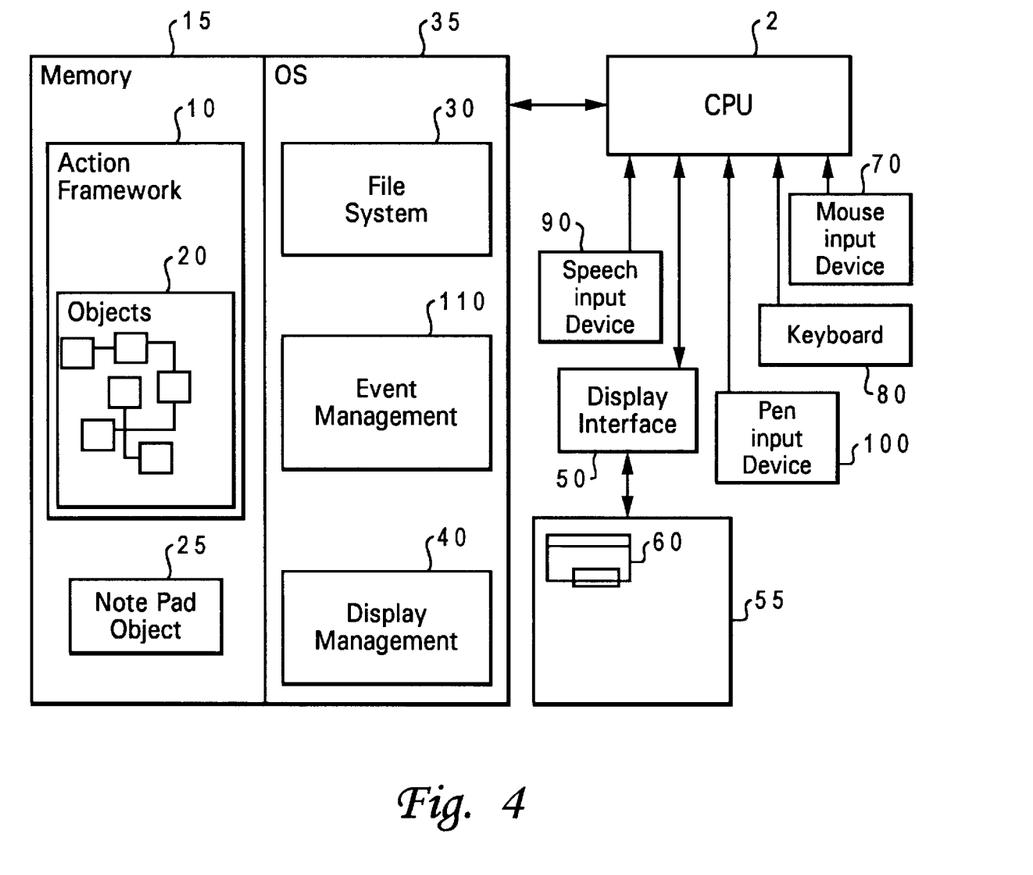
FIG. 4 is a schematic diagram further illustrating a system in accordance with the preferred embodiment of the present invention.

The system of the preferred embodiment will now be discussed in more detail with reference to FIG. 4, which is a block diagram showing the main functional elements of the system. As mentioned earlier, in the preferred embodiment, the system is provided with an Action Framework 10 that comprises a set of base OOP objects 20 that can be logically 'wired' together with application code for performing a task. The action framework 10 uses the underlying file system 30 of the operating system to load from system storage and store in memory 35 the view attributes that are associated with the views of objects that exist within the framework 10.

Once the menu definitions and action objects required by a particular application have been constructed, the display management system 40 of the operating system (provided by 'Presentation Manager' in IBM's OS/2 operating system) is used to create the necessary signals for the display interface 50 to display the views of those objects on the display device 55. Typically, these views would be displayed in a GUI windowing interface 60. The display management system 40 is also used to create the necessary signals to display the note pad UI object 25, and the user pages created from that note pad object.

Via the GUI interface 60, the user can interact with the system in order to select choices. Selection can be achieved by the user in more than one way, including a standard pointer device such as a mouse 70, a keyboard 80, a speech input device 90, a pen input device 100 or through a touch screen. Whichever way the user makes a selection, the various device drivers will create an event that is handled by the Event Management system 110 of the operating system. Within IBM's OS/2 operating system, the event management function is handled by the operating system and Presentation Manager by provision of a standard control and windowing messaging system.

If the user selects a view or the note pad object, then the selection event is mapped via the identification means 4 to the appropriate action object 20 or note pad object 25 respectively. The note pad object 25 is illustrated in FIG. 4 separately from the action framework 10 since, as explained earlier, it need not be embodied as an OOP object. However, in preferred embodiments, the note pad object 25 would be implemented as an OOP object and preferably be part of the action framework. If the note pad object is selected, this will cause a blank user page to be created, to which the user can add views of actions as desired. When a view is selected, whether from a user page or otherwise, this will cause a routine to be invoked that will perform the requested task irrespective of how or where the selection event is generated.

For more information about the construction of action objects and menu definitions, the reader is referred to the description of the earlier mentioned copending UK patent application 9613767.4, a copy of which is enclosed on the Patent Office file for reference.

Figure 5A:
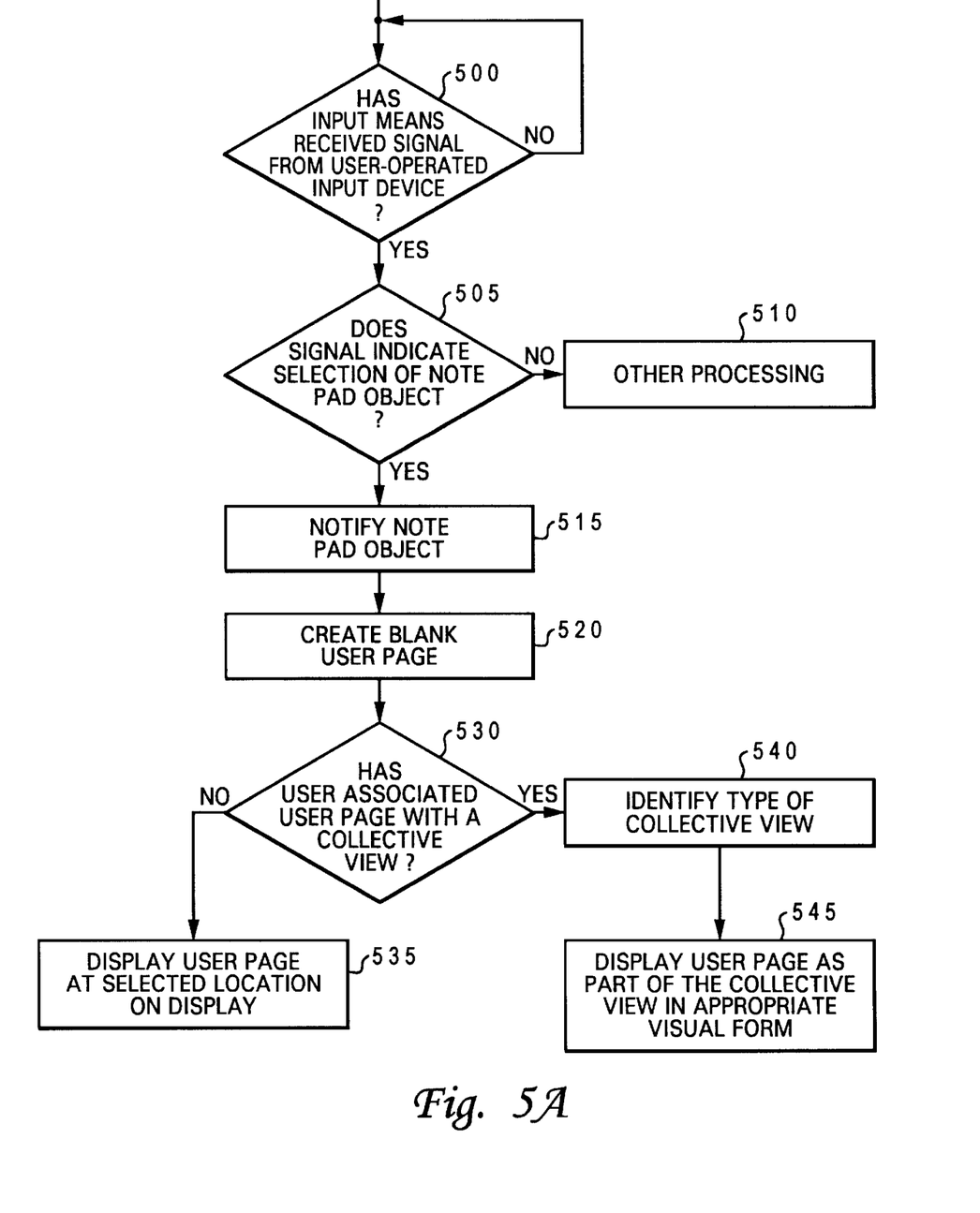
FIGS. 5A and 5B are flow diagrams illustrating how user pages are created and how views of actions are added to those user pages.

To further illustrate the processing steps involved in creating a user page from a note pad object, reference will be made to FIG. 5A, which is a flow diagram illustrating the processing steps. At step 500, it is determined whether the input means 3 has received a signal from one of the user operated input devices 70, 80, 90, 100. If not, the process waits until such a signal has been received. Once a signal has been received the identifying means 4 determines at step 505 whether the signal received corresponds to a selection of a note pad object displayed on the display device 55. If not, then the process proceeds to other processing steps 510. These other processing steps may for instance be steps to determine whether the user has selected an action view, in which case the corresponding action object would be notified in order to cause the desired processing operation to take place.

If the signal does indicate that a note pad object has been selected, then the process moves to step 515, where the note pad object is notified. At this point the note pad object creates a blank user page (step 520) for display to the user. Before displaying the user page to the user, at step 530 it is determined whether the user has associated the user page with a collective view. As mentioned earlier with reference to FIG. 3, the user may associate the user page with a collective view such as a tool bar or note book by dragging from the note pad object to the collective view before releasing the mouse button. Alternatively, the user may just select that the user page be displayed somewhere else within the GUI by dragging the mouse cursor to that position.

If at step 530, it is decided that the user has not associated the user page with a collective view, then the user page is displayed at a selected location on the display screen, either a location chosen by the user or else some predetermined location (step 535). However, if the user page is to be associated with a collective view, then at step 540, the type of collective view is determined. In preferred embodiments, this occurs automatically, since, when the user page is dropped on the collective view, the collective view queries the user page action object for an appropriate view. For example, if the collective view is a note book, then the note book would query the user page action object for its note book view. Other collective views might query the user page action object for its layout or tool bar view. The user page action object would normally return a tool bar button to a tool bar collective view, and a string of the action name to a menu bar collective view. Once the user page action object has responded to the query from the collective view, then at step 545 the user page is displayed in the appropriate visual format as part of the collective view. Hence, as mentioned above, if the collective view is a tool bar, the user page would be displayed as a selectable tool bar button, whereas if the collective view is a note book, the user page would preferably be displayed as the first page of that note book.

Figure 5B:
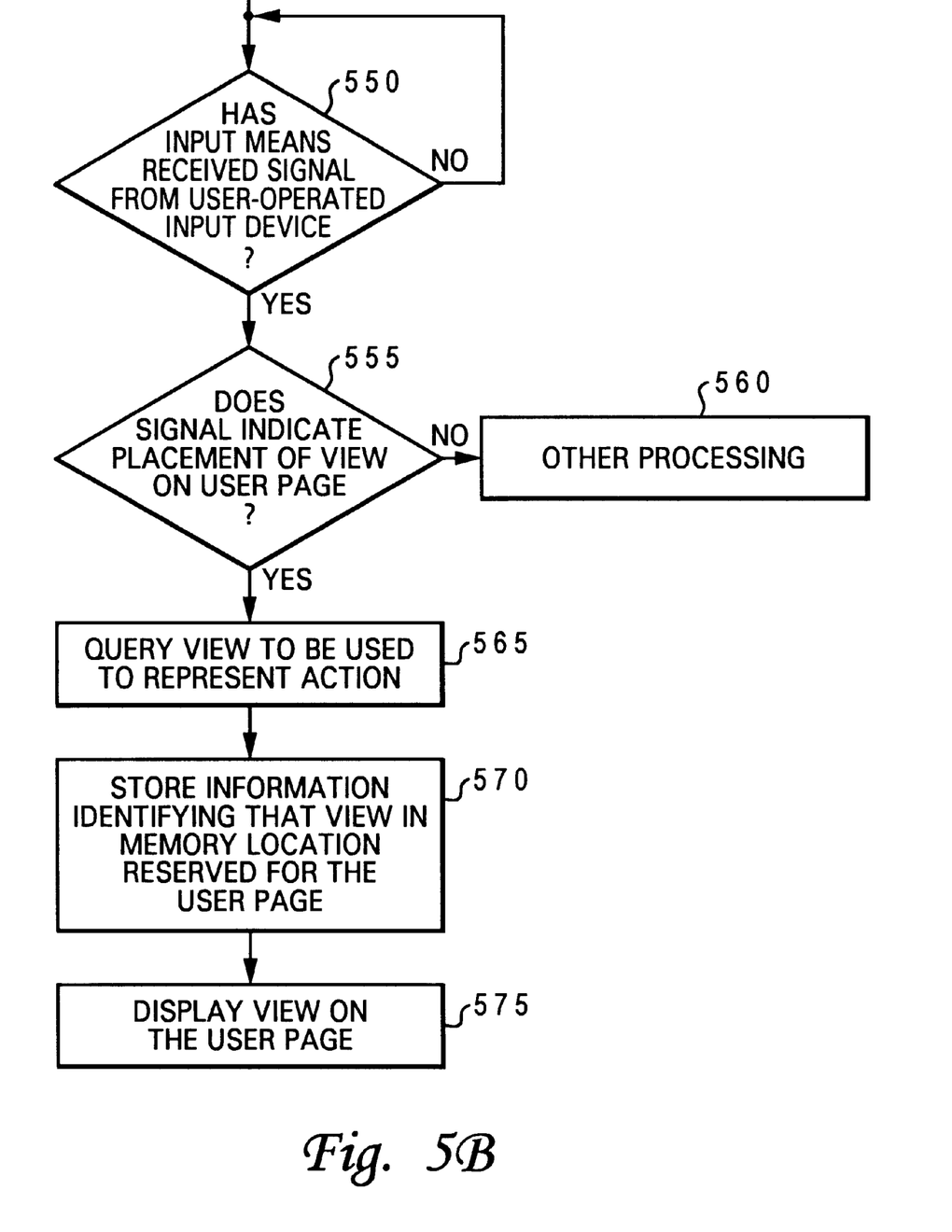

The process by which views are associated with a user page once it has been created will now be discussed further with reference to FIG. 5B. At step 550, it is determined whether the input means 3 has received a signal from a user-operated input device. If not, the process waits for the receipt of such as signal. Once a signal has been received, the view association means 9 determines whether the signal received corresponds to the association of a view with the user page (step 555). This may be determined, for example, as a result of a drag and drop function causing a view to be dropped on an area of the GUI occupied by the user page.

If the signal does not correspond to such an association, then the process moves to step 560, where other processing steps are performed. As with FIG. 5A, these other processing steps may for instance be steps to determine whether the user has selected an action view, in which case the corresponding action object would be notified in order to cause the desired processing operation to take place.

If the signal does correspond to the association of a view with the action object, then at step 565, the user page queries the action object represented by the view to determine which view of that action should be used to represent the action on the user page. Next, at step 570, information identifying that view is stored in a location of memory 15 reserved for the user page. In the preferred embodiment, where the user page is represented by an OOP object, a pointer to the action object represented by the view is stored as an entry within the user page menu definition along with the information identifying which row and column within the user page the action view is to be displayed in. Then at step 575, the view is displayed on the user page.

Figure 6A:
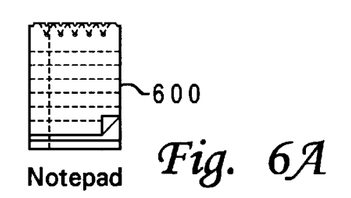
FIGS. 6A to 6G illustrate various representations of the note pad object, and of the user pages created from the note pad object.
Figure 6B:
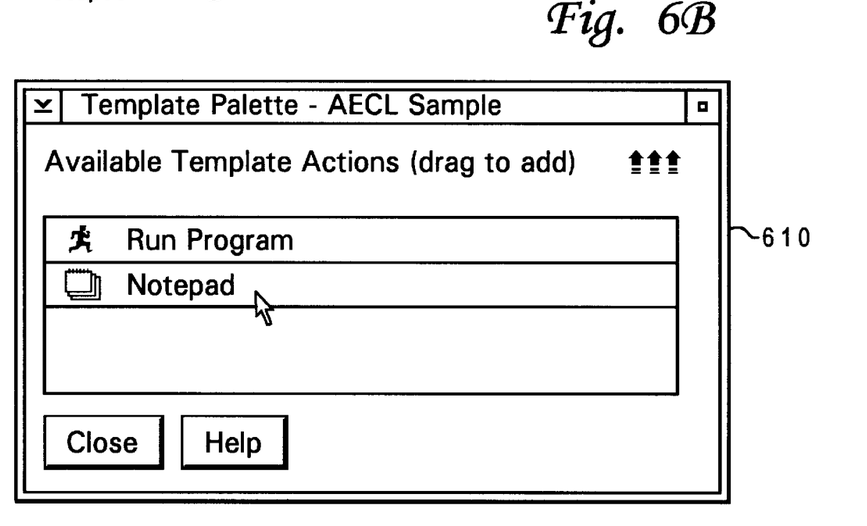
Figure 6C:
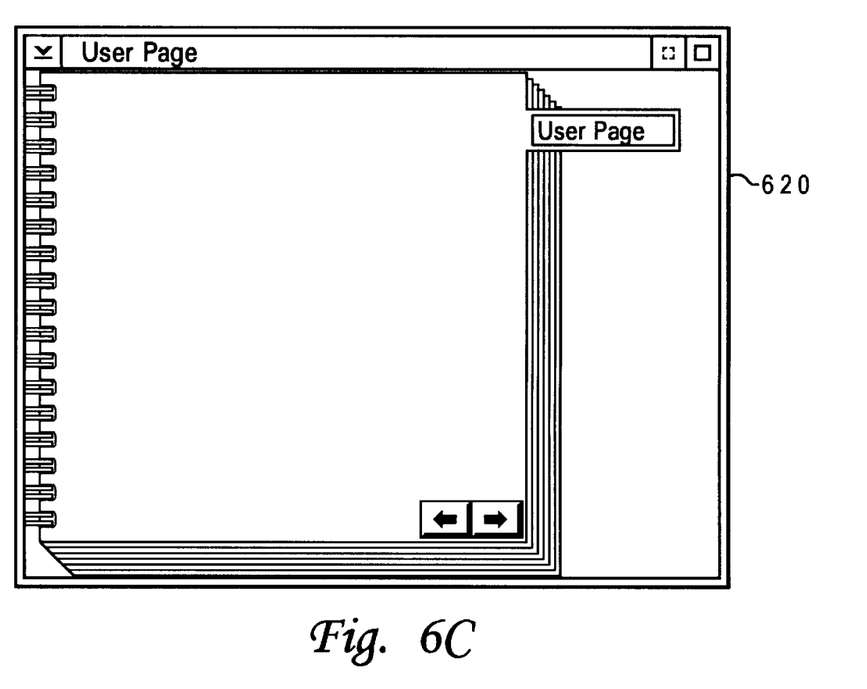

The note pad object and user pages created from that object will now be illustrated with reference to FIG. 6. Typically, the note pad object will be displayed to the user in some graphical form, such as the graphical representation 600 illustrated in FIG. 6A. In preferred embodiments, the Note Pad object is accessible from a template action palette view 610, as illustrated in FIG. 6B. The template action palette view provides a list of available actions of the template type which, once selected, create an instance of a new action object which the user can interact with in the same manner as a standard action. The template action palette is preferably drag drop enabled, such that the user can drag a copy of the note pad object 600 from the palette to some other location on the display screen, at which point a blank user page is created at that location. Such a blank user page 620 is illustrated in FIG. 6C.

Figure 6D:
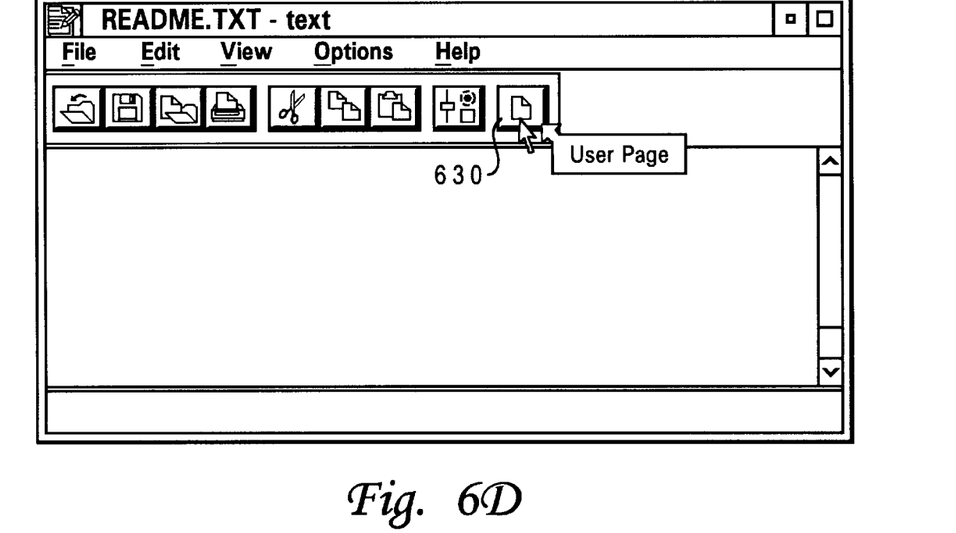

If the position to which the user page object is dragged corresponds to a collective view, then the manner in which the user page is displayed will be dependent on the collective view with which it is associated. If the collective view is one which only occupies a small area on the display screen, such as for example a tool bar, then the user page is created as a selectable tool bar button 630 on the tool bar which, when selected, displays the user page either on its own or as part of a view such as a property note book. This is illustrated in FIG. 6D.

Figure 6E:
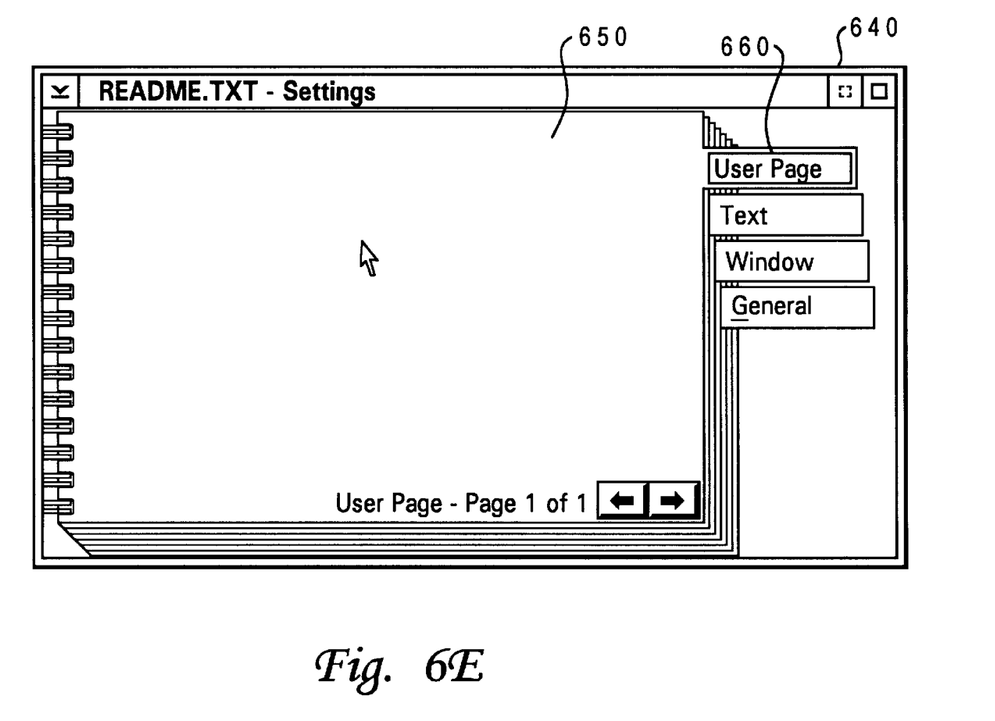

If the collective view is one which facilitates the display of the user page in full, then there is no need for a reduced representation and in preferred embodiments none is used. An example of such a collective view is a note book 640, the user being able to attach the user page directly on to an existing property notebook, where it preferably becomes the first page 650 in that book, as illustrated in FIG. 6E.

Figure 6F:
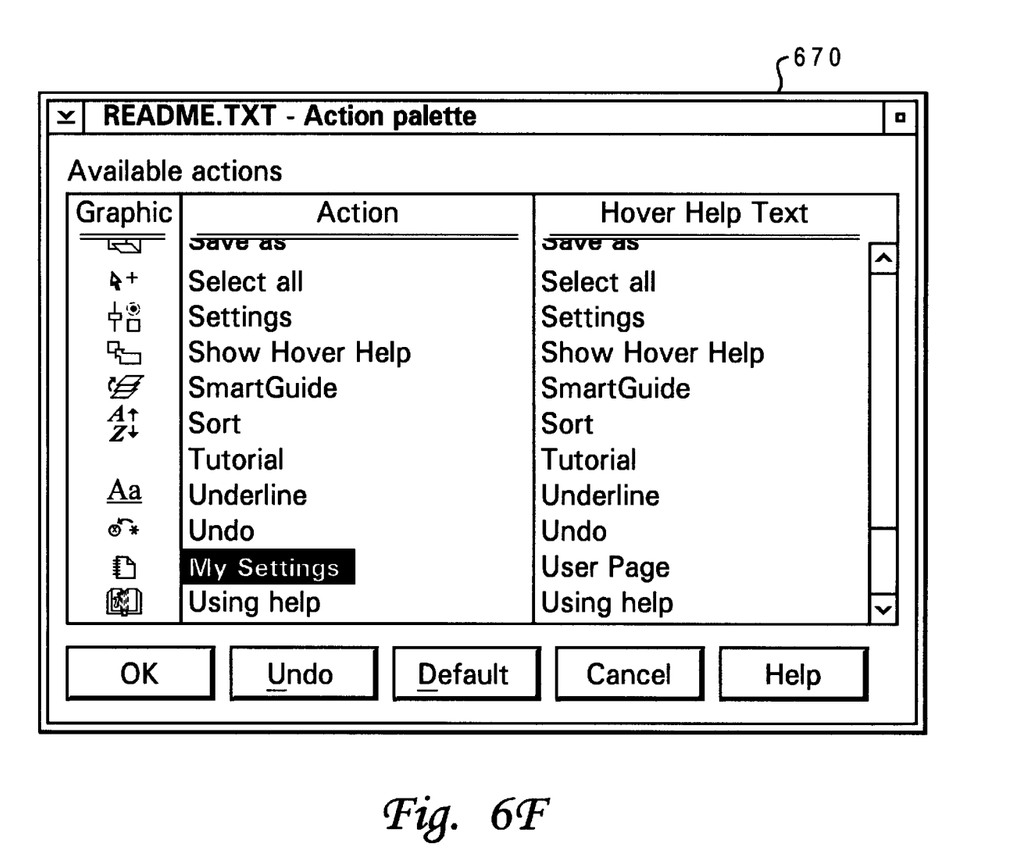

The tab 660 attached to the right hand side of the user page 650 in the note book displays by default that the page is a user page, but the user can change this name. In the preferred embodiment of the present invention, the new action instance of a user page that is created from the template note pad action is automatically added to an action palette 670 as illustrated in FIG. 6F. The action palette view provides a list of available action objects. This allows the user to change the name of the newly created user page from the action palette, which in turn will cause the text that appears on the tab for that user page to change.

One reason why the user would want to create these user pages is to move views of commonly used actions into one common layout. Assuming a suitable mechanism is provided for representing actions and their views (such as the mechanism described in the earlier mentioned copending UK patent application 9613767.4), then the user page will be able to accept the drop of all types of actions on to the page. As actions can have a number of different views, the user page queries the views that can be used to represent the action. For example, in preferred embodiments, the user page would query whether the action has a layout view, and if not it then queries whether there exists a tool bar view. The layout view will generally be the largest available view, and so is preferably the one chosen for display if the action concerned has a layout view. For more information about how a collective view queries which views an action object can provide, the reader is referred to the description of UK Patent application 9613767.4, a copy of which is provided on the Patent Office file for reference.

User Pages are organised as a list of actions, with the added capability of maintaining spatial relationship between the different views of actions using a row and column canvas technique. A suitable canvas is the multi cell canvas which is a layout mechanism provided as part of the IBM Visual Age $C^{++}$ product, but it will be apparent to those skilled in the art that other canvases could be used. A canvas works on the principle of defining a window layout using rows and columns rather than exact coordinates. When the user page detects that the user wishes to add a new action to the page, depending on where the action is 'dropped', a new row or column is added to the canvas, and the view of the action is displayed within the newly created cell. Canvas behaviour is well known to those skilled in the art, and hence need not be discussed in any more detail herein. When an action view has been added to the canvas, an entry is added to the user page menu definition for that action identifying the row and column where the action view is displayed within the canvas. The list of actions held by the user page by default would display the action name first followed by the action's view. As the user can edit the action name from within the action palette view (see FIG. 6F), it can be made more meaningful by the user if required.

Figure 6G:
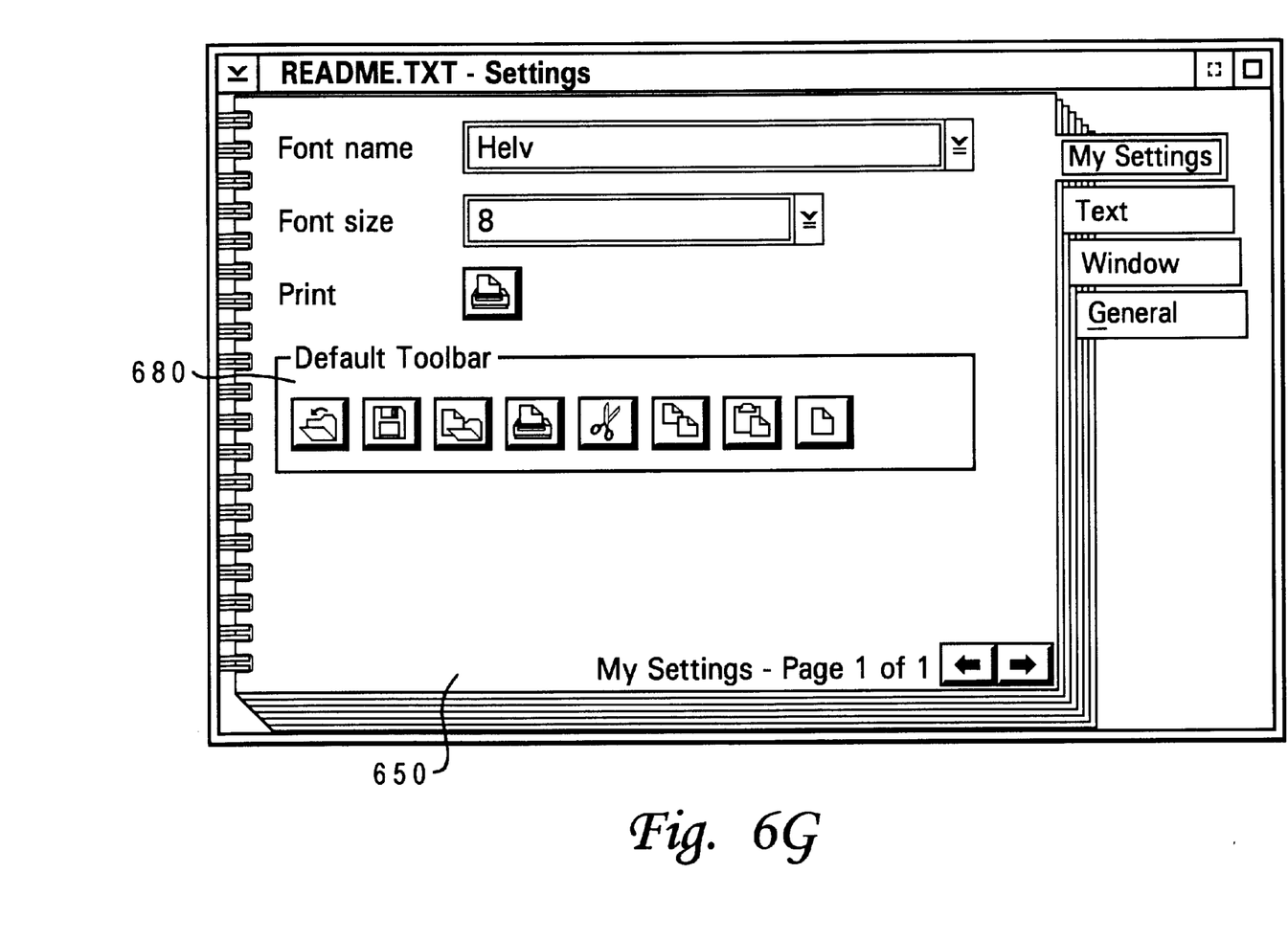

In addition to allowing views of actions to be dropped on to the user page, the user page also allows collective views such as a tool bar control 680 to be dropped on the page. Preferably, the static text for this group of actions would be the tool bar name, and the actions with their tool bar button view would be copied and wrapped underneath. A user page including both standard views and collective views is shown in FIG. 6G.

Considering now the addition of a user page to a note book, this allows the user to promote views from the note book onto the front page. This can be achieved by either using a local copy function which allows actions to be copied and pasted between collective views, by dragging the desired actions from an action palette, or by dragging action views from the note book page on to the user page before it has been attached as the first page of the note book. This technique solves the problem of the user spending longer than is necessary to find commonly used actions within an application or operating system. It provides an easy to use mechanism for the user to group actions together and decide the best arrangement of these actions to achieve a quick route for selecting them. It also provides the user with a customisable canvas that can group tool bars and property actions in a larger display area, so solving the problem of space restraints on tool bars that were not really designed for holding large views such as combination box controls and entry fields. By employing suitable mechanisms for representing actions, such as the technique described in UK patent application 9613767.4, the full benefits of the note pad object can be realised, since any actions, including property actions, can be added to a user page, which can then be added to any collective view (such as a tool bar) to allow quick access to commonly used functions. In the preferred embodiment, any action (being represented by a single OOP action object) has a clear model view separation, in as much as the user can drag a view of that object from, for example, a note book page to promote that view to, for example, a tool bar, and the extra view of that single action thereby generated will automatically keep in sync with any other view on the same action.

The solution of the preferred embodiment enables the user to promote commonly used actions from other pages to a front page within a notebook. This allows a fast path to commonly used functions that may be in the same note book or different note books. It also allows a place where tool bars can be copied to, therefore providing a canvas for all types of actions, whether they are property actions or other types of actions.

I claim:

1. A computer system connectable to a display device to display a graphical user interface through which a user can select an action from a tool bar in order to invoke a desired operation, and including a property action capable of retaining a user selectable data, the property action being selectable by one or more view of that property action provided via the graphical user interface, the system being characterized by:

means for providing a container object which is displayable via the graphical user interface on the display device, the container object being arranged to respond to user selection by creating a user page for display to the user;

identifying means for identifying when a user selection of the container object has occurred, and for informing the container object of that selection, thereby causing a user page to be created;

view association means for enabling a user to associate views of the property action with the user page created upon selection of the container object;

a toolbar button displayed within the toolbar and associated with the user page wherein selection of the toolbar button causes the user page having associated views of the property action to be displayed; and selection means for enabling the user to select a respective view of a property action associated with a user page to cause the property action to be performed, wherein property actions may be invoked from within a toolbar.

2. A system claimed in claim 1, wherein the container object is a note book, and the user page is associated with the note book and is represented in the note book as one of the pages of the notebook, the view association means serving to enable the user to add views included in other pages of the notebook to the user page.

3. A system as claimed in claim 2, wherein the user page is represented in the note book as the top page of the notebook.

4. A system as claimed in claim 1, wherein the view association means utilizes drag and drop functions provided via the graphical user interface to enable the user to associate views with the user page.

5. A system claimed in claim 1, further comprising:

means for providing a property action object, the property action object defining, for each of said one or more views that can be employed to represent the property action, the attributes required to provide that view, and an identifier to identify the operation to be invoked upon selection of the property action;

the identifying means being arranged to identify when a user selection of a view has occurred, and to inform the associated property action object of that selection;

the property action object being responsive to the identifying means to employ the identifier to generate a command to invoke the desired operation; and whereby property actions can be invoked by the same mechanism irrespective of where in the GUI the views of that property action are represented.

6. A system as claimed in claim 5, further comprising means for providing a menu definition object to define collective views of property actions, the menu definition including (a) a set of entries that individually represent either a property action objection or a reference to another menu definition, and (b) the attributes required to provide a visual representation of the collective view.

7. A system as claimed in claim 1, further comprising a template action palette view which is displayable on the display device to provide a list of available template actions including a representation of the container object.

8. A method of operating a computer system connectable to a display device to display a graphical user interface through which a user can select an action from a toolbar in order to invoke a desired operation, and at including a property action capable of retaining a user selectable data, the property action being selectable by one or more views of that property action provided via the graphical user interface, the method being characterized by the steps of:

providing a container object which is displayable via the graphical user interface on the display device, the container object being arranged to respond to user selection by creating a user page for display to the user;

employing an identifying means to identify when a user selection of the container object has occurred;

informing the container object of that selection, thereby causing a user page to be created;

associating a view of a property action object with the user page upon receipt of signals from a user operated device connectable to the system indicating a user association of that view with the user page;

displaying a toolbar having a toolbar button associated with the user page wherein selection of the toolbar button causes the user page having associated views of the property action to be displayed; and providing selection means for enabling the user to select a respective view of a property action associated with a user page to cause the action to be performed, wherein property actions may be invoked from within a toolbar.

* * * * *